United States Patent [19]

Auer et al.

[11] Patent Number: 5,202,540
[45] Date of Patent: Apr. 13, 1993

[54] TWO-WAY RING COMMUNICATION SYSTEM FOR ELEVATOR GROUP CONTROL

[75] Inventors: Bruno Auer; Jurgen Schlotter, both of Berlin, Fed. Rep. of Germany

[73] Assignee: Otis Elevator Company, Farmington, Conn.

[21] Appl. No.: 29,495

[22] Filed: Mar. 23, 1987

[30] Foreign Application Priority Data

Apr. 3, 1986 [EP] European Pat. Off. ........ 86104551.6

[51] Int. Cl.⁵ ............................................. B66B 5/02
[52] U.S. Cl. .................................. 187/101; 187/102; 187/124
[58] Field of Search ................. 187/101, 102, 124; 307/147; 364/131, 133, 200; 370/85.12

[56] References Cited

U.S. PATENT DOCUMENTS

| | | | |
|---|---|---|---|
| 1,912,918 | 6/1933 | Rossman | 307/147 |
| 2,975,306 | 3/1961 | Langston | 307/147 |
| 4,042,783 | 8/1977 | Gindi | 370/85.12 |
| 4,078,228 | 3/1978 | Miyazaki | 370/85.12 |
| 4,114,730 | 9/1978 | Means et al. | 187/101 |
| 4,308,935 | 1/1982 | Deric | 187/102 |
| 4,346,789 | 8/1982 | Ekholm | 187/124 |
| 4,435,705 | 3/1984 | Stevens | 370/85.12 |
| 4,473,133 | 9/1984 | Enriquez et al. | 187/101 |
| 4,500,951 | 2/1985 | Sugimoto et al. | 364/186 |
| 4,509,117 | 4/1985 | Korowitz | 364/200 |
| 4,554,659 | 11/1985 | Blood et al. | 370/85.12 |
| 4,569,041 | 2/1986 | Takeuchi et al. | 370/85.12 |

FOREIGN PATENT DOCUMENTS

| | | |
|---|---|---|
| 0030823 | 6/1981 | European Pat. Off. .. |
| 0148297 | 7/1985 | European Pat. Off. .. |
| 2041581 | 9/1980 | United Kingdom . |
| 2077954 | 12/1981 | United Kingdom . |

*Primary Examiner*—A. D. Pellinen
*Assistant Examiner*—L. Colbert

[57] ABSTRACT

Each car controller (10) in a multicar elevator system provides two serial asynchronous full duplex I/O channels to communicate with the next and previous car controllers. These two channels allow the transmission of a message in two opposite directions (32,34) on a communications ring. A single interruption of the ring, by an interrupted transmission line or a disturbed car controller for example, guarantees the transmission of messages to each car controller in at least one of the two directions.

Each car controller contains three remote serial link interfaces. The first remote serial link interfaces to the car fixtures; car buttons, car tell tale lights, etc. The second remote serial link interfaces to car related hall fixtures; hall position indicator hall lantern, etc. The third remote serial link interfaces to the group related hall fixtures; hall buttons, hall tell tale lights, etc.

To ensure the operation of the group related hall fixtures if a car controller fails or is switched off, a switchover module (28,36) is used. The purpose of the switchover module is to connect the group related hall fixtures to one of two car controllers. In the event that a car controller fails or is switched off, the switchover module connects the group related hall fixtures to the other car controller.

3 Claims, 5 Drawing Sheets

TWO-WAY RING COMMUNICATION SYSTEM FOR ELEVATOR GROUP CONTROL

BACKGROUND OF THE INVENTION

The architecture of multiple elevator control systems normally consists of a car controller for each car to perform car-related signaling and motion functions and a separate group controller to perform group-related signaling and dispatching functions. Group control functions are those functions relating to the response of several cars to hall calls. The weak point of such a system architecture is the group controller. If the group controller fails, there is no further response to group signals, such as hall calls. To guarantee further group control in case of a group failure, at least a second group controller has to be provided, with additional circuitry to detect a group failure and switch to the second redundant group controller.

DISCLOSURE OF THE INVENTION

Therefore, it is an object of this invention to provide a technique for group and car control with a fault tolerant architecture and without the necessity of using coat-intensive redundant system components.

According to the invention, each car controller (10) provides two serial asynchronous full duplex I/O channels to communicate with the next and previous car controllers. These two channels allow the transmission of a message in two opposite directions (32,34) on a communications ring. A single interruption of the ring, by a interrupted transmission line or a disturbed car controller for example, guarantees the transmission of messages to each car controller in at least one of the two directions.

Each car controller contains three remote serial link interfaces. The first remote serial link interfaces to the car fixtures; car buttons, car tell tale lights, etc. The second remote serial link interfaces to car related hall fixtures; hall position indicator hall lantern, etc. The third remote serial link interfaces to the group related hall fixtures; hall buttons, hall tell tale lights, etc.

To ensure the operation of the group related hall fixtures if a car controller fails or is switched off, a switchover module (28,36) is used. The purpose of the switchover module is to connect the group related hall fixtures to one of two car controllers. In the event that a car controller fails or is switched off, the switchover module connects the group related hall fixtures to the other car controller.

Other objects, features and advantages of the invention will become apparent in light of the following description thereof.

BEST MODE FOR CARRYING OUT THE INVENTION

Figure 1:
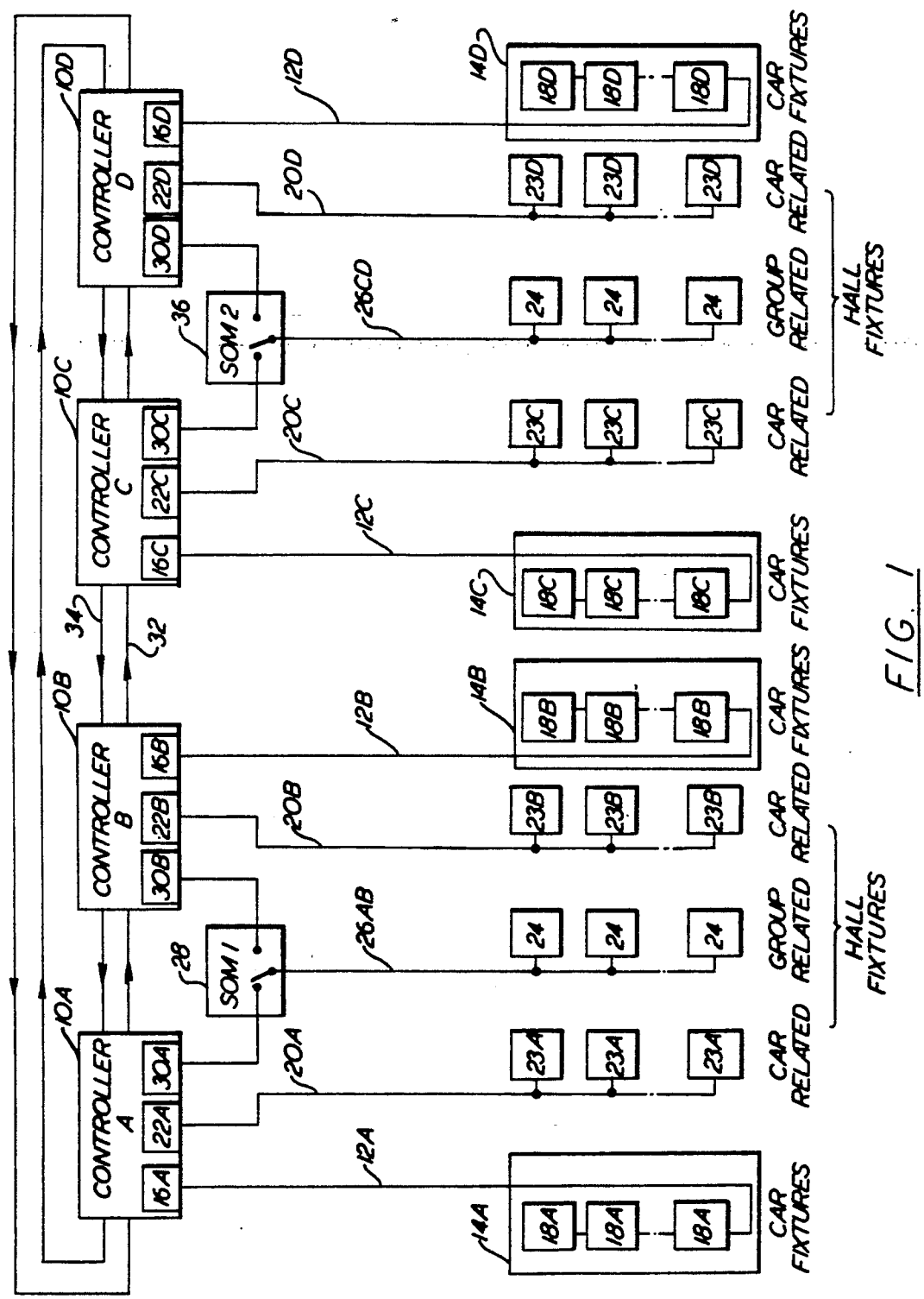
FIG. 1 is a schematic of the two-way ring communication system of this invention.

FIG. 1 shows the system architecture of the two-way ring communication system for a four-car group. A car controller 10A is connected via a serial link 12A to fixtures in the car 14A. A master station 16A in the car controller 10A, and remote stations 18A in the car 14A serve as interfaces to the serial link 12A, and are discussed in detail in commonly-owned U.S. Pat No. 4,497,391 (Mendelsohn et al., 1985), entitled MODULAR OPERATIONAL ELEVATOR CONTROL SYSTEM. The car controller 10A is also connected via a serial link 20A to car-related hall fixtures; again via a master station 22A in the car controller 10A and remote stations 23A associated with the car-related hall fixtures.

Car controllers 10B, 10C and 10D are identical to the car controller 10A, and are similarly connected via master stations 16B–16D, serial links 12B–12D, and remote stations 23B–23D to car fixtures for the cars 14B–14D; and via master stations 22B–22D, serial links 20B–20D, and remote stations 18B–18D to car-related hall fixtures for the cars 14B–14D. Group-related hall fixtures are linked via remote stations 24 and a serial link 26AB to a switchover module 28 that is operable to provide the signals therefrom to/from master station 30A or 30B in either of the controllers 10A or 10B, respectively. As shown, the switchover module 28 is providing signals to/from the master station 30A in the controller 10A. The switching over of the switchover module is discussed in greater detail hereinafter.

The car controllers 10A–10D are connected for communication with one another via a two-way communication ring comprising a first serial link 32 providing data one way from the controller 10A, to the controller 10B, to the controller 10C, to the controller 10D, and a second serial link 34 providing data in the opposite direction the controller 10D, to the controller 10C, to the controller 10B, to the controller 10A. Thus each car controller is in direct communication with the next and previous car controller on the ring. Messages are passed around the ring under control of each car controller, which performs an error check and passes the received message to the next car controller only if no errors are detected. This communication concept allows in case of a car controller failure to isolate the faulty car controller by the two neighboring car controller. In this event, further communication is ensured due to the two ring communication lines.

It will be note that a second switchover module 36 receives signals on serial link 26CD from remote stations 24 associated with a second, optional set of group-related hall fixtures, and is operable to provide these signals to/from master stations 30C or 30D in either of the controllers 10C or 10D, respectively. As shown in FIG. 1, the switchover module 36 is providing signals to/from the master station 30C in the controller 10C.

Figure 2:
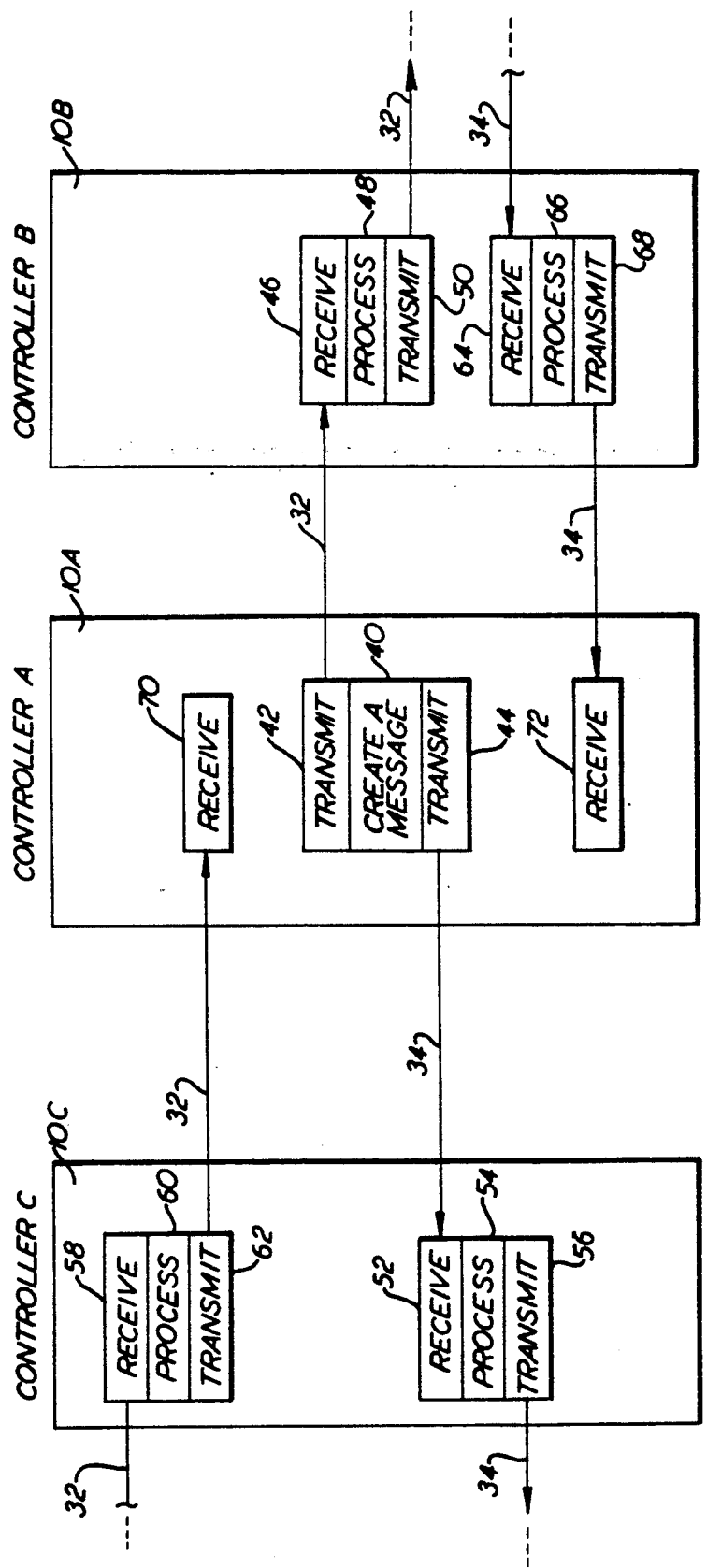
FIG. 2 is a logic diagram showing generally how a message is processed on the two-way ring communication system of FIG. 1.

FIG. 2 shows how a message is processed on the ring communication system, for instance in a three car group configuration. Assume that the car controller 10A creates a new message (40), a status message for example. A leader (or trailer) on the message is indicative of its origin at controller 10A. Controller 10A then transmits (42) the same message to controller 10B in one direction on the line 32, and transmits (44) the same message to controller 10C in the opposite direction on the line 34. Controller 10B receives (46) the message on the line 32, and processes (48) the message which includes an error check to detect an invalid message, caused by a transmission error for example. If no errors are detected, controller 10B retransmits (50) the message on the line 32 to the controllers 10.

In a similar manner, the controller 10C receives (52) the message on the line 34, proceses (54) the message, and retransmits (56) the message on the line 34 to the controller 10B.

The controller 10C receives (58), processes (60), and retransmits (62) the message received on the line 32 from the controller 10B to the controller to the controller 10A, and the controller 10B receives (64), processes (66), and retransmits (68) the message received on the line 34 from the controller 10C to the controller 10A. The controller 10A receives (70) the message on the line 32 from the controller 10C, and also receives (72) the message on the line 34 from the controller 10B, recognizes it (by the leader/trailer) and finalizes the transmission.

The communication concept is based on the following two basic rules:
1. A message originated by a car controller has to be received after the "round trip time", independent of the message destination, before further action is taken. A simple watchdog timer is provided for this purpose.
2. A message received by a car controller is retransmitted again without any modification so long as no errors are detected. If errors are detected, the message is ignored (not retransmitted).

These two basic rules allow the originator of a message to ensure that each car has received the same message as long as at least one of the two identical messages are received by the originator; the implication being that the message made it at least in one direction around the ring. Furthermore, this concept allows deletion of invalid messages on the ring as soon as possible.

If the originating car controller does not receive any of the two identical messages, this can be true if both directions 32, 34 are interrupted by a disturbed car for example. In this case, the same message is transmitted in the two directions once again after a timeout period. After the next timeout period the originator then assumes that each car has received the message. This assumption is acceptable because the ring communication concept allows in case of an interrupted ring that each car can be reached by the originator in at least one of the two directions.

Figure 3:
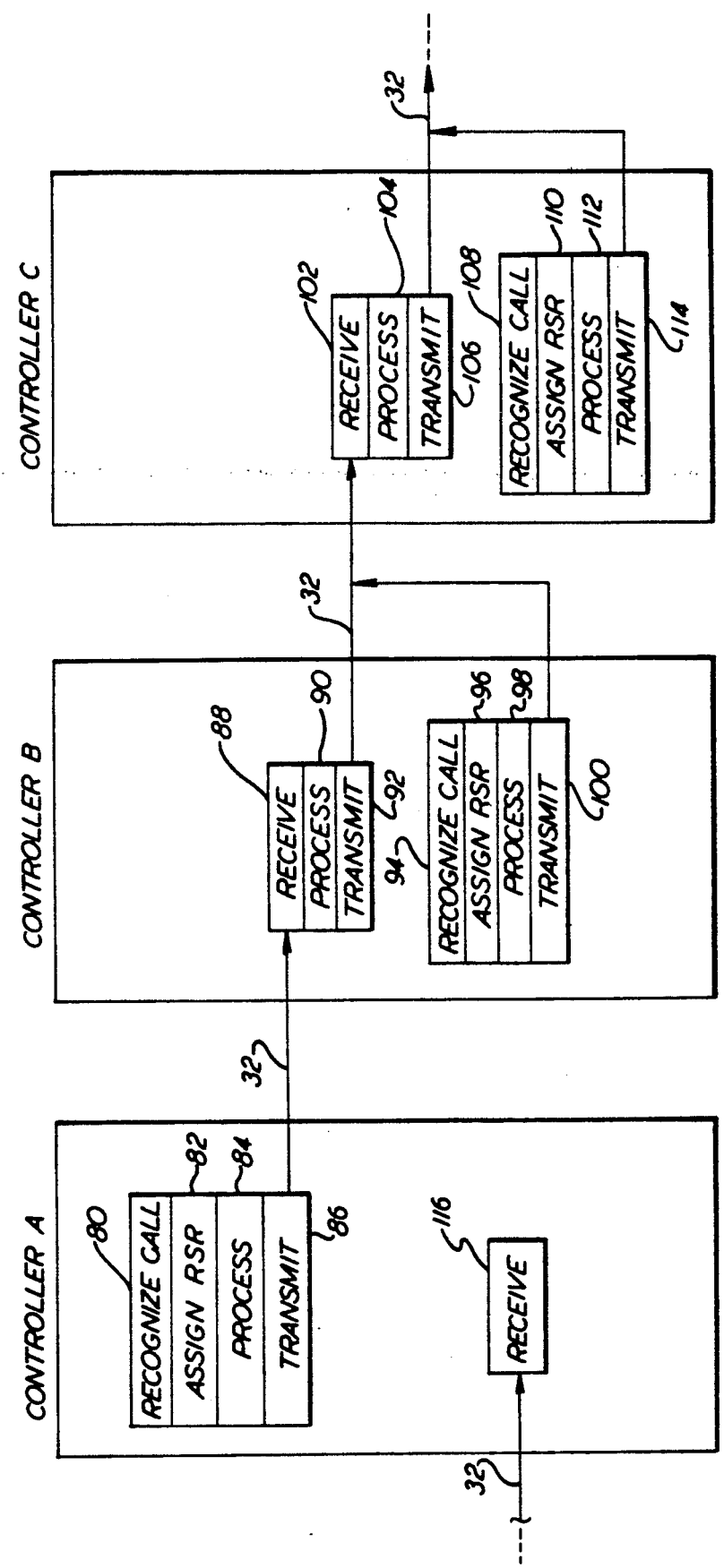
FIG. 3 is a logic diagram showing how a specific message is processed on the two-way ring communication system of FIG. 1.

FIG. 3 shows the different steps performed to dispatch or to redispatch a hall call on the ring communication systems for a three car group. The example shows only one direction (the line 32) of the two-way communication system. Assume that car controller 10A is connected (via the switchover module 28) to the group-related hall fixtures and receives a hall call request, or that car controller 10A initiates a hall call dispatching. Car controller 10A creates a hall call message which includes the steps: recognize the hall call (80), calculate the Relative System Response (RSR) value for the car 14A (82), and processes the message for transmission (84). (The RSR value is a measure of how long it would take for a car to respond to a call.) It then transmits (86) the hall call response message.

The following steps performed to process the message on the ring are according to the general ring communication concept described with regard to FIG. 2. The controller 10B receives (88), processes (90), and retransmits (92) the message received from the controller 10A. Then, the controller 10B creates its own hall call response message by recognizing the call (94), assigning an RSR value to it (96) for the car 14B, processing a second hall call response message (98), and transmitting (100) that message around the ring on the line 32. Similarly, the controller 10C receives (102), processes (104), and retransmits (106) the hall call response messages from the controllers 10A and 10B on the line 32, and creates its own hall call response message by recognizing the call (108), assigning an RSR value to it (110) for the car 14C, processing (112) a third hall call response message, and transmitting (114) the new message around the ring on the line 32. The controller 10A receives (116) the hall call response messages from the controllers 10B and 10C. Thus, it is seen that all three controllers have access to all three hall call response messages.

After each controller has received the hall call response messages of the other controllers in the group, each controller is able to independently decide which car is the best and which one will respond to the hall call. The time required to make the decision which car responds to the hall call depends on the number of cars in the group and the number of messages processed on the ring. A typical value is approximately 30 milliseconds for a three car group configuration. Thus, it is evident that both car and group functions are performed in each controller 10A,10B,10C.

The RSR values are reviewed every 0.2 seconds. In the normal case, the car with the lowest RSR value services the call and sends a hall call cancel message. Each controller stores all of the RSR's, if the call is not services after two cycles. A controller does not cancel another controller's higher RSR message. (To do otherwise would violate Rule 2.) In the case of a tie (RSR values equal for two or more cars), a random number is added to each of the tied RSR's and they are weighed against each other; the lowest RSR value winning out.

Figure 4:
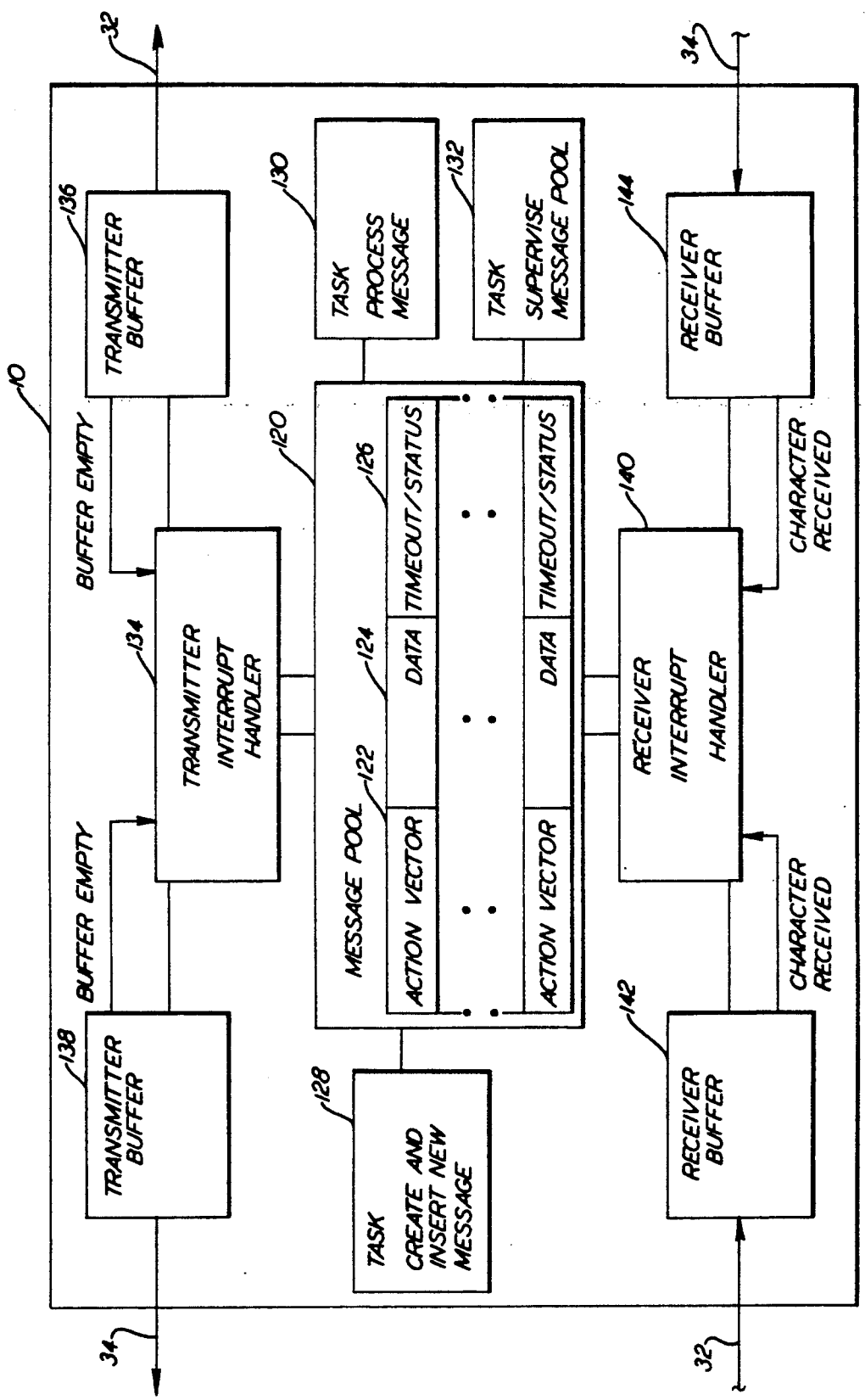
FIG. 4 is a schematic of the major functional blocks within a controller 10 of FIG. 1.

FIG. 4 illustrates the car controller message handling concept, as follows. Message handling is performed by different function blocks. The Message Pool 120 which is the central function block, is a message buffer area used to store a number of messages until the messages are processed.

Each message stored in the message pool is divided into three different fields. The first field 122 contains information as to which action has to be performed by that message. The following four actions are required:
Transmit message in left direction (to previous car controller).
Transmit message in right direction (to next car controller).
Process message if information determined for this car controller.
Supervise and control the message pool.

The second field 124 contains the message information (data). The third field 126 provides status and timeout information used to control the actions performed. Write and read access to and from the message pool is managed by the following task interrupt handler modules:
Task Create and Insert New Message Module 128
This task is called whenever a new message has to be created. It creates and inserts the message into the message pool, sets the respective action vectors and initializes the timeout and status information.

Task Process Message Module 130 This task is called whenever a message stored in the message pool contains information determined to that car controller. It processes the message and deletes the message from the message pool.

Task Supervise Message Pool Module 132 This task is called whenever the message pool contains messages. It supervises and controls timeout conditions and initiates the respective actions required. It is also used to detect identical messages and deletes the redundant messages.

Transmitter Interrupt Handler Module 134 The transmitter interrupt handler is called whenever a transmitter buffer 136, 138 becomes empty. (The transmitter buffer 136 transmits on the line 32, and the transmitter buffer 138 transmits on the line 34.) It searches for messages in the message pool which has to be transmitted and fills the transmitter buffer with the next characters of a message.

Receiver Interrupt Handler Module 140 The receiver interrupt handler is called whenever a receiver buffer 142,144 contains received characters. (The receiver buffer 142 receives from the line 32 and the receiver buffer 144 receives from the line 32.) It moves the character to the message pool and if a message is complete it performs an error check, sets the respective action vectors and initializes the timeout and status information.

The transmitter and receiver buffers 136,138, 142,144 are part of a dual serial communication interface IC which controls the serial data transmission. The interface IC is described in greater detail in commonly-owned U.S. Patent application Ser. No. 546,219, filed on Oct. 27, 1983 by Kupersmith et al., and entitled INDUSTRIAL COMMUNICATIONS UNIT.

One advantage of the Two-Way Ring Communication System is that a group may be split into subgroups, without interruption of service, simply by splitting the Ring (i.e., disconnecting the lines 32 and 34).

Figure 5:
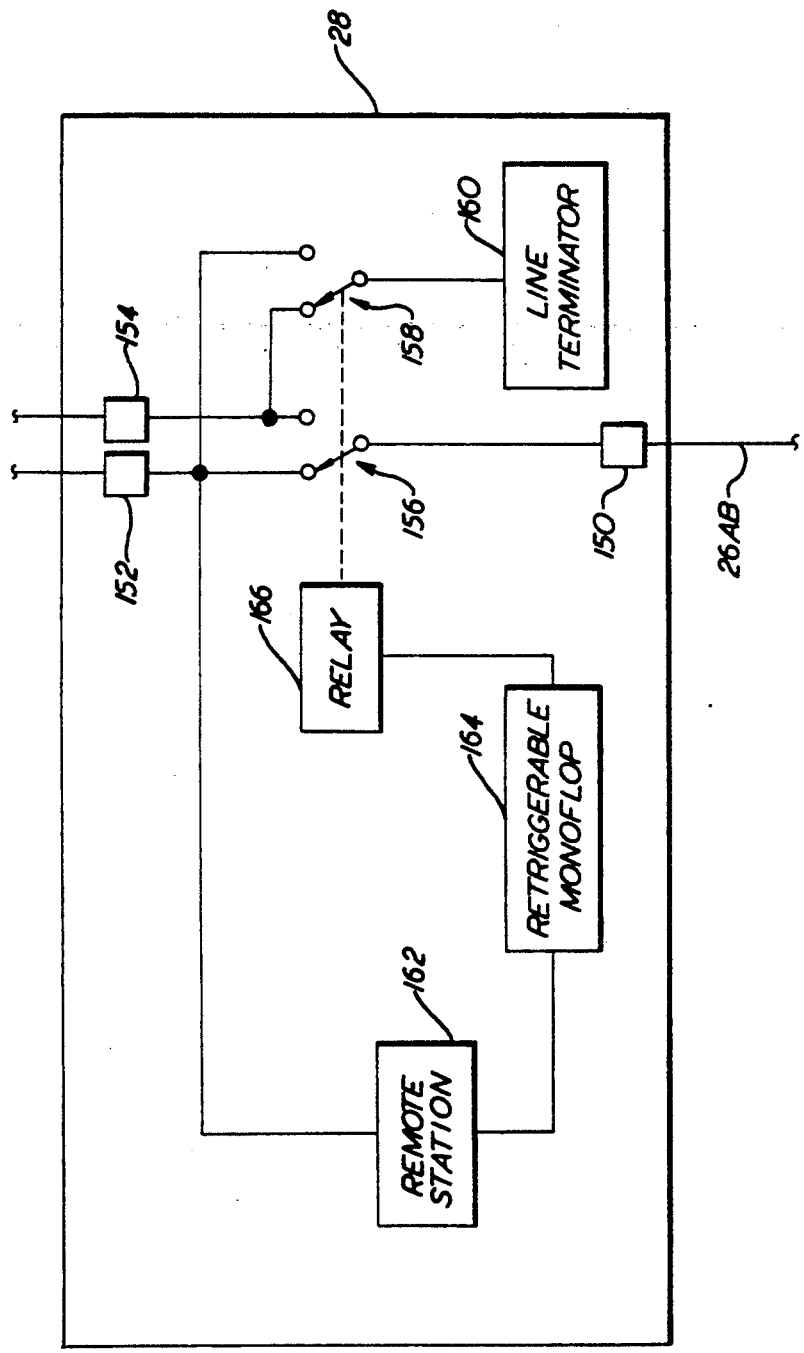
FIG. 5 is a schematic of the switchover modules 28,36 of FIG. 1.

FIG. 5 shows the hardware of the switchover module 28. (The switchover module 36 would be identical, but attached to different lines.)

The switchover module 28 has three serial links; a link 150 connected to the group hall device via the line 26AB, a link 152 connected to the master station 30A of the controller 10A, and a link 154 connected to the master station 30B of the controller 10B. When both car controllers are functioning, the link 150 is connected through relay contacts 156 to the controller 10A, and the link 154 to the controller 10B is terminated through relay contacts 158 to a line termination network 160.

A remote station 162 within the switchover module 28 is connected to the link 152 for response to the controller 10A. When the controller 10A fails, as determined by self-tests, a message is provided on the link 152 to which the remote station 162 responds by triggering a bistable device, such as a retriggerable monoflop 164 driving the relay 166 so that the contacts 156 connect the link 150 to the link 154 for controller 10B and the contacts 158 connect the line terminator 160 to the controller 10A.

We claim:

1. A multicar elevator system, characterized in that:
    a controller is associated with each car to process intercar messages; and
    the controllers are linked together in serial fashion on a two-way communication system so that the messages of each controller are passed along to and processed by each of the other controllers in two directions on two independent lines.

2. An elevator system according to claim 1, characterized in that:
    a switchover module (28,36) receives/transmits signals on a line (26AB) from group-related hall fixtures (24) to a first controller (10A) so long as the first controller (10A) is functioning properly, and receives/transmits the signals on the lines (26AB) from the group-related hall fixtures (24) to a second car controller (10B) when the first car controller (10A) malfunctions.

3. A multicar elevator system wherein:
    a controller (10) is associated with each car to process car and group messages;
    the controllers (10) are linked together in serial fashion on a two-way communication system so that the messages of each controller are passed along to the other controllers in two directions on two independent lines (32,34), and wherein
    a switchover module (28,36) receives/transmits signals on a line (26AB) from group-related hall fixtures (24) to a first controller (10A) so long as the first controller is functioning properly and receives/transmits the signals on the lines (26AB) from the group-related hall fixtures (24) to a second car controller (10B) when the first car controller (10A) malfunctions.

* * * * *